July 5, 1966  H. N. FAIRBANKS ETAL  3,259,451
FILM GATE

Filed Sept. 6, 1963  4 Sheets-Sheet 1

INVENTORS.
HENRY N. FAIRBANKS
DANIEL H. ROBBINS
BY
Frank E. Robbins
ATTORNEY

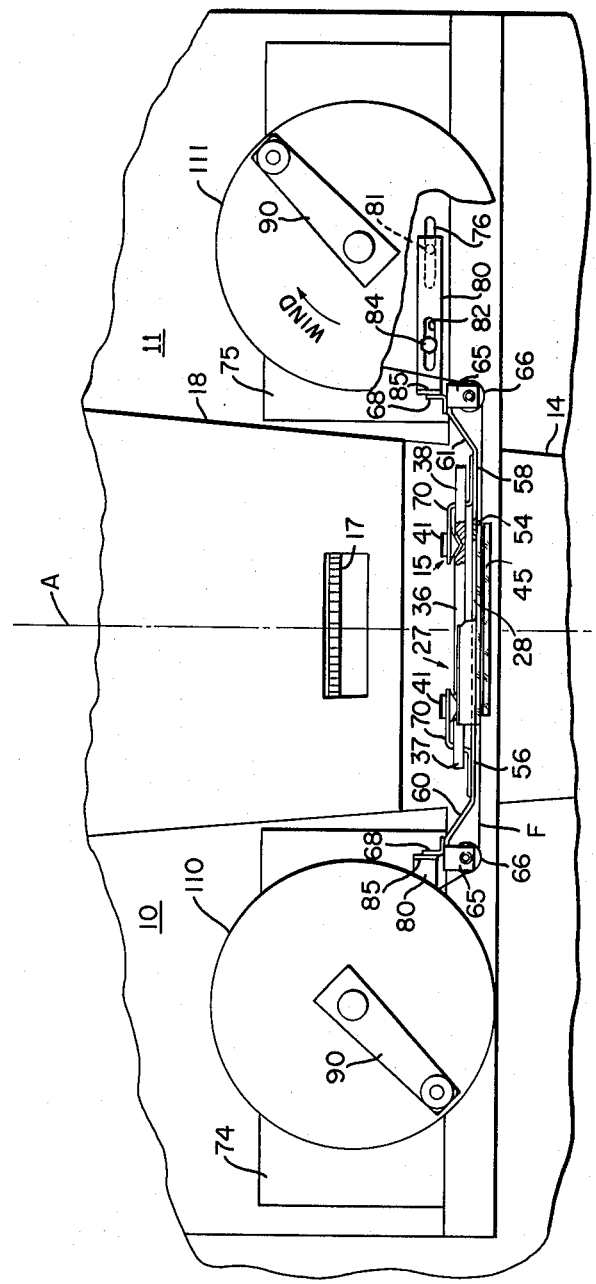

July 5, 1966
H. N. FAIRBANKS ETAL
3,259,451
FILM GATE
Filed Sept. 6, 1963
4 Sheets-Sheet 3
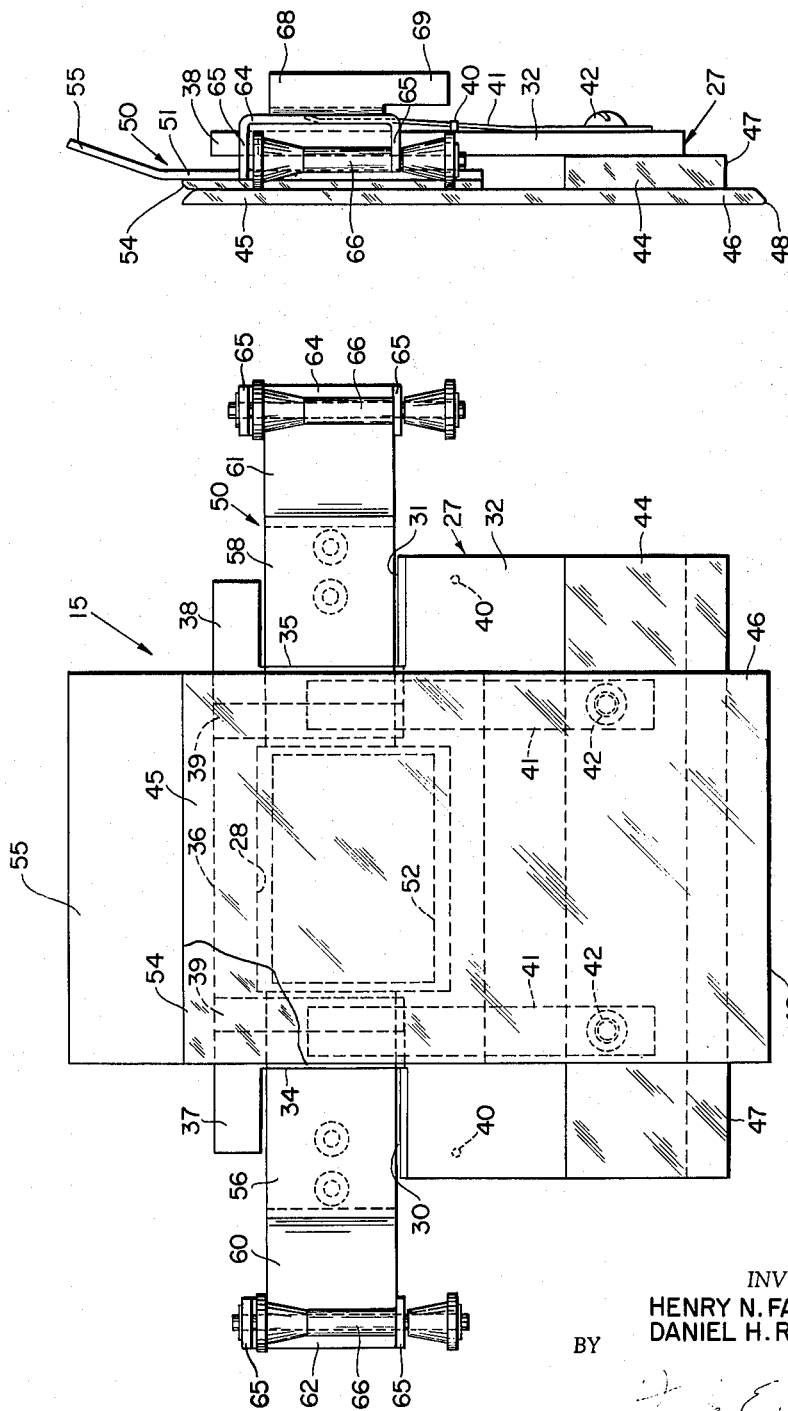
INVENTORS.
HENRY N. FAIRBANKS
DANIEL H. ROBBINS
BY
*Frank E. Liuline*
ATTORNEY July 5, 1966  H. N. FAIRBANKS ETAL  3,259,451
FILM GATE
Filed Sept. 6, 1963                                    4 Sheets-Sheet 4
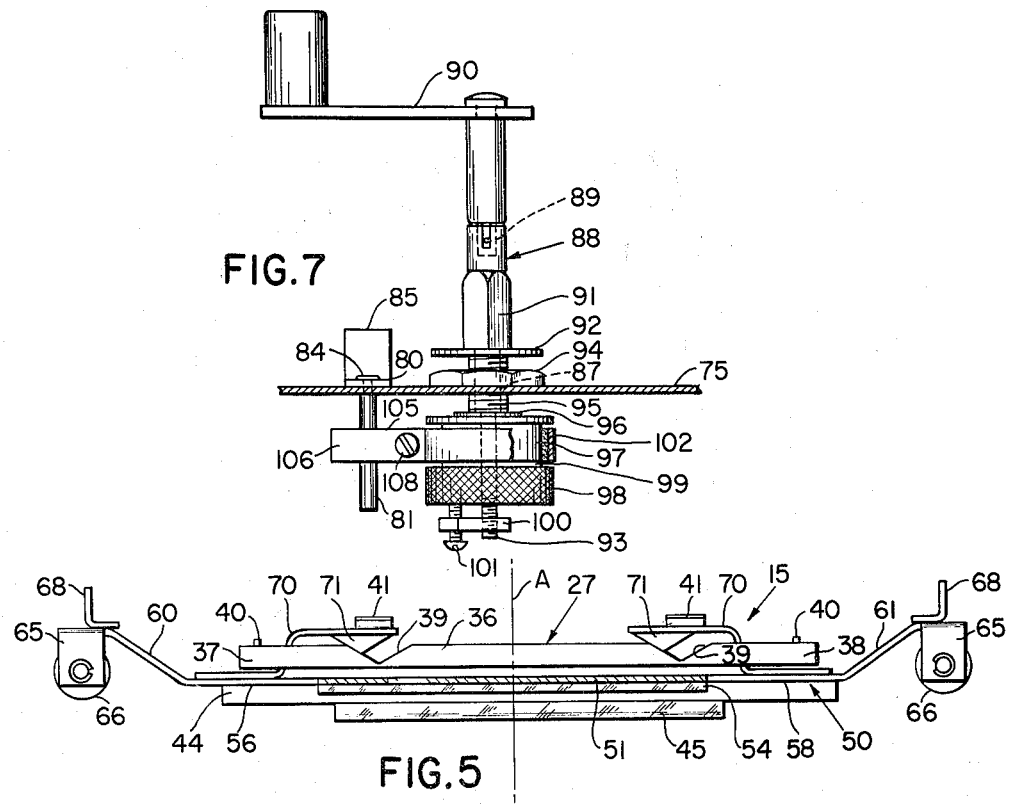
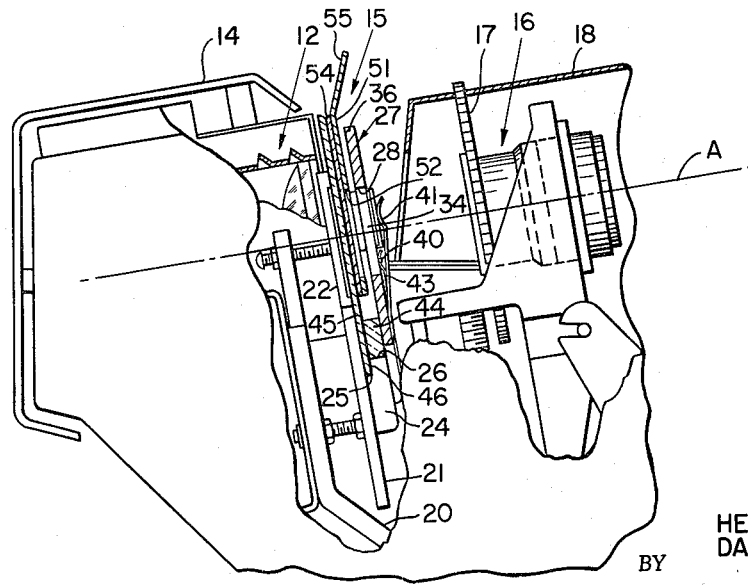
INVENTORS.
HENRY N. FAIRBANKS
DANIEL H. ROBBINS
BY
ATTORNEY

United States Patent Office 3,259,451
Patented July 5, 1966

3,259,451
FILM GATE
Henry N. Fairbanks and Daniel H. Robbins, Rochester, N.Y., assignors, by mesne assignments, to Itek Corporation, Lexington, Mass., a corporation of Delaware
Filed Sept. 6, 1963, Ser. No. 307,070
14 Claims. (Cl. 352—225)

This invention relates to photographic apparatus. More particularly, the invention relates to a film gate for use with microfilm on reels.

In recent years, the use of microfilm as a means for recording information has become widespread. One of the problems, that is associated with microfilm, is the fast and accurate retrieval of information from the microfilm. One phase of this problem is that of obtaining, in a convenient and efficient manner, enlarged reproductions of microfilmed information.

In the copending patent application of Daniel H. Robbins, Milfred H. Craft and Thomas J. Madigan, Ser. No. 156,359, filed December 1, 1961, there is disclosed a reader-printer that can be used efficiently with microfilm mounted in aperture cards, and, as well, with film chips mounted in acetate jackets. This machine provides a practical means for viewing information stored on the microfilm, and, if desired, for making a high quality photographic reproduction, on an enlarged scale, from the microfilm. However, this machine is not designed to handle film that is stored on reels, and some improvisation has been necessary to use this reader-printer with microfilm on reels. This is inconvenient, and, unless the microfilm on a reel is very carefully handled, it may be scratched, or damaged in some other way.

The hazard of damaging microfilm is often a source of serious concern. In many cases, information stored on microfilm represents the only available copy or source of the information and cannot be easily replaced.

The present invention is an outgrowth of the recognition of a need for a practical means for adapting the reader-printer of Robbins et al. so that it can be used to handle reeled microfilm conveniently, effectively, and safely. This invention therefore necessarily involves, among other things, the provision of a suitable film gate that will permit transport of the film from one reel to another, at either fast wind or scanning speeds, and that can also be used to hold a portion of the film at a preselected location in the light path of the optical projection system for viewing and for reproduction.

Film gates have been designed in the past that seek to eliminate or minimize the risk of damage to sensitive film surfaces. However, typically, in the operation of film gates previously available, the film gate opens, to permit the free passage of the film therethrough, only after the film is already in motion. This necessarily subjects a portion of the microfilm to the hazard of damage by scratching, through frictional engagement under pressure, and while in motion, against a surface or surfaces of the film gate, until the gate opens.

One object of the present invention is to provide a practical film gate that eliminates the hazard of film damage.

Another object of the invention is to provide a new film gate of general application with film on reels, that operates effectively and efficiently and that safeguards the film.

A related object of the invention is to provide a new, practical system for transporting film through a film gate, together with means for opening and closing the film gate automatically so as to couple operating effectiveness and efficiency with maximum film safety.

A further object of the invention is to provide a new, practical film gate, together with a system for automatically opening the film gate whenever the film is to be transported, and that is operative for either direction of transport of the film through the gate.

Another object of the invention is to provide a practical film gate that is light weight, automatic in its operation, has relatively few parts, is easy to manufacture, and that is safe to use with film.

A more specific object of the invention is to provide a film gate that can be used as part of an adapter system to convert the Robbins et al. reader-printer for use with microfilm on reels.

Another specific object of the invention is to provide a practical film gate that is light in weight, automatic in its operation, has relatively few parts, is inexpensive to manufacture, and is safe to use with film, for use as a part of an adapter kit to permit the Robbins et al. reader-printer, and, as well, other devices, to be used with film on reels.

Still another object of the invention is to provide a winding and reeling system for handling film on reels, and for permitting transport of the film through a projection path or film gate, that prevent tearing and breaking of the film, and that reduces the hazard of other damage to the film.

Another specific object of the invention is to provide a practical film gate for use with the Robbins et al. reader-printer, that is readily interchangeable with the film holder of that device that is intended for use with aperture cards and microfilm jackets, so that the reader-printer can be used interchangeably either with aperture cards and jackets or with microfilm on reels.

Another and related object of the invention is to provide an interchangeable film gate of the character described that is part of an adapter system that permits the Robbins et al. reader-printer to be used in connection with microfilm on aperture cards and microfilm in jackets, and so that the interchange can be fast and convenient.

Other objects of the invention will be apparent hereinafter from the specification and from the recital of the appended claims.

The Robbins et al. reader-printer is in the form of a console that is built into its own table. It has an optical projection system that includes a holder that can handle microfilm, either mounted in aperture cards, or in the form of chips that are mounted in acetate jackets. This holder includes a pair of glass plates or flats that are mounted at a right angle to the optical axis of the optical projection system, and that are spring pressed into face-to-face engagement with each other. A manually-operated arm is provided that can be used to move one of these glass flats away from the other, to permit the insertion or removal of an aperture card or an acetate jacket between the flats. The optical projection system is designed to project a brilliant image onto a screen for viewing or, at the option of the machine operator, onto a photosensitized paper for making a photographic reproduction.

The present invention provides means for modifying the Robbins et al. reader-printer by adding to the reader-printer a system that includes a pair of reels, a film gate, and mechanism for operating the film gate. The film gate is readily interchangeable with the holder that is originally provided with the reader-printer, while the reels and certain other mechanisms are permanently installed and become a part of the reader-printer.

Details of the invention will be better understood by reference to the specific embodiment thereof that is illustrated in the drawings that form a part of this application.

In the drawings:

FIG. 1 is a fragmentary front elevation of a reader-printer, with the lamp, condenser assembly, and their cover removed, and that has been adapted in accordance with a preferred embodiment of the present invention for handling microfilm on a reel, showing a front part of the reader-printer at table-top level, as viewed from a plane that is parallel to a plane through the axes of the spindles of the microfilm reels, the film gate being shown in its closed position and being partly broken away at its right side in the drawing, better to show the structure behind the film gate, the reels being shown empty and the front, stationary optical flat of the film gate being partly broken away, better to show the moveable optical flat behind it;

FIG. 2 is a fragmentary top plan view thereof, showing a part of the condenser assembly cover, and with the right hand reel in the drawing being partly broken away, better to show the structure that is disposed beneath the reel, showing film wound around the reels and threaded through the closed film gate, and with the film gate partly broken away;

FIG. 3 is a front elevation, on an enlarged scale, of the film gate in its closed position with the front, stationary optical flat being partly broken away as in FIG. 1;

FIG. 4 is a side elevation thereof;

FIG. 5 is a top plan view, partly in section, of the film gate in an open position;

FIG. 6 is a fragmentary view, partly in side elevation and partly in a section taken on the optical axis of the system, showing the way in which the film gate is mounted in the optical projection system of the reader-printer, and FIG. 7 is a fragmentary part elevation, part section, of an enlarged scale, of a spindle and its associated mechanism for opening the film gate.

Figure 1:
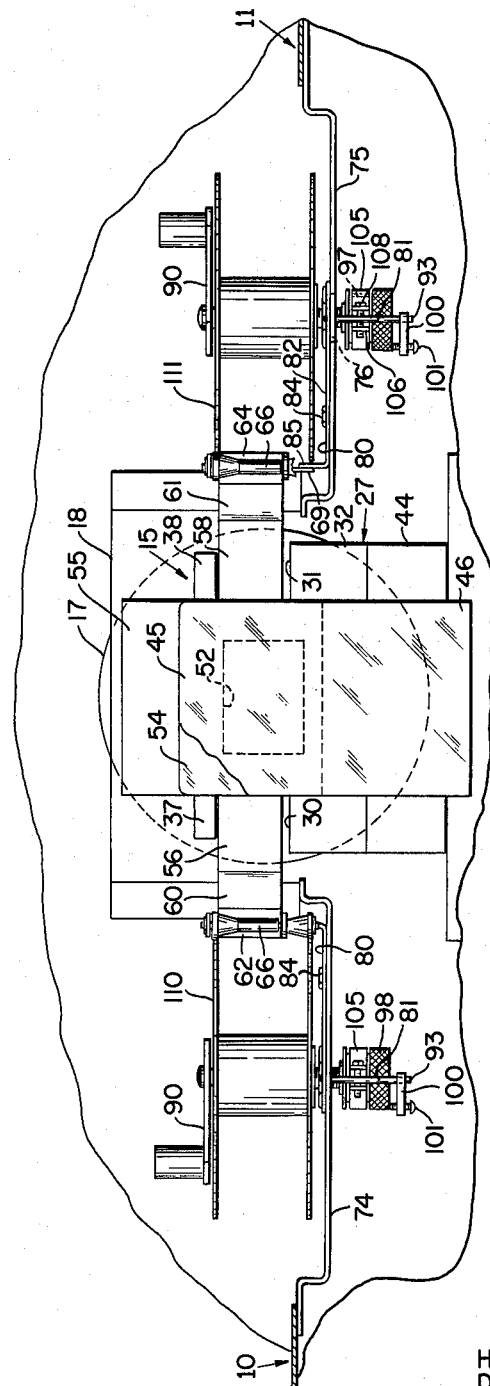

Referring now in detail to the drawings by numerals of reference, and particularly to FIGS. 1 and 2, the numeral 10 denotes generally the left table top of the reader-printer console, and the numeral 11 denotes generally the right table top of the reader-printer console. These table tops 10 and 11 are metal panels that are supported on a rigid skeleton or frame (not shown), and provide reference points from which the mounting of the adaptor system can be described.

The optical projection system of the reader-printer includes a condenser assembly 12 (FIG. 6) that is rigidly mounted on the frame of the reader-printer, intermediate the left and right table top panels 10 and 11, and that is protected by a removable condenser cover 14. A lamp or other source of light (not shown) is mounted beneath the condenser cover 14, in front of the condenser assembly 12, to project light rays through the condenser assembly along a path about the optical axis A. The film gate is generally denoted by the numeral 15 and is mounted behind the condenser assembly 12, across the optical axis A. A lens assembly 16, that is equipped with a knurled focusing wheel 17, is mounted back of the film gate, beneath a lens cover 18.

As is described in greater detail in the copending Robbins et al. patent application, the reader-printer is provided with a carriage that permits the film holder to be adjusted in position relative to the optical axis A. The film holder supports and the adjustable carriage are shown only in part in FIG. 6 of this application and include a rigid arm 20. A pair of plates 21 and 22, that are mounted one above the other, are adjustably supported from the arm 20. The lower plate 21 extends across the entire width of the condenser assembly 12, whereas the upper plate 22 is of less width, and consists of a pair of plate sections that are disposed at the respective sides of the path of the light rays that are projected from the condenser assembly, so as not to obstruct them. A block 24 is mounted for sliding movement over the rear face of the lower plate 21. This block 24 is supported from a part of the adjustable carriage (not shown) of the reader-printer. It is formed with a front, lower step 25 in its upper surface, and with a higher, rear step 26. These two steps are registering surfaces on which either the film holder or the film gate rests, and the position of the film holder or film gate relative to the optical axis can be adjusted by causing the block 24 to slide over the surface of the plate 21.

The film gate 15 of the present invention is formed so that it can be interchanged readily with the film holder of the Robbins et al. reader-printer, on the same mounting. The film gate 15 comprises a "stationary" plate 27 that has a somewhat unusual configuration. It is generally rectangular in shape. It is formed toward its upper end, and over a central portion of its upper end, with a generally rectangular window 28 (FIGS. 3 and 6). It is also formed with a pair of large slots or recesses 30 and 31, of generally rectangular shape, in its left and right surfaces relative to FIGS. 1 and 3. The combined effect of the recesses 30 and 31, and of the rectangular window 28, is that the stationary plate 27 has, in effect, a generally rectangular base portion 32 (FIGS. 3 and 4), from which a pair of plate columns 34 and 35 extend upwardly at opposite sides of the window 28, and that are united at their upper ends with a horizontally extending section 36 that is integral with the plate columns 34 and 35, and whose lower surface forms the upper boundary of the window 28. The upper section 36 of the plate 27 extends laterally at either side of the plate, to provide a pair of arms 37 and 38 that bound the recesses 30 and 31 respectively.

The stationary plate 27 is also formed, on its rear face, with a pair of parallel grooves 39 (FIGS. 3 and 5) that have a generally V-shaped section and smooth walls. These grooves extend from the top surface of the plate 27 to well below the lower edge of the window 28, in the rear faces respectively of the plate columns 34 and 35.

The plate 27 is also formed on its back surface, adjacent the respective opposite lateral sides of its base portion 32, with a pair of small, upstanding generally cylindrical projections 40. These projections are intended to engage in openings in a pair of leaf retainer springs 43 (FIG. 6) that are mounted at opposite sides of the block 24, respectively, to hold the film gate against the plates 21 and 22.

A pair of leaf springs 41 are mounted on the rear face of the plate 27. Each of these springs is secured at its lower end to the rear face of the plate 27 by a threaded fastener 42 (FIGS. 3 and 4). A relatively thick spacer block 44 is secured across the lower front face of the plate 27 by the fasteners 42. This spacer bar is coextensive in width with the plate 27 but is formed and mounted to project below the lower end of the plate 27.

A glass flat 45 (the "stationary flat") is secured to the front surface of the spacer bar 44. This glass flat 45 is generally rectangular in shape. It is less wide than the plate 27, but is of greater height, and extends above the upper edge of the plate 27 and below the lower edge of the spacer bar 44, to provide a small lip portion 46 that depends downwardly below the lower edge of the spacer bar.

The lower edge 47 of the spacer bar 44 is formed and disposed to seat snugly on the surface of the upper step 26 of the block 24 (FIG. 6); and similarly, the lower surface 48 of the lip 46 of the glass flat 45 is formed and disposed to seat on the surface of the lower step 25 of the block 24. These two surfaces 47 and 48, together with the mating surfaces of the upper and lower steps 26 and 25 respectively of the block 24, when engaged, properly position the film gate 15.

The film gate 15 also comprises a movable plate that is indicated generally in FIGS. 3, 4 and 5 by the numeral 50. This movable plate is formed with a generally rectangular central section 51 (FIGS. 4, 5 and 6) that is formed with a rectangular window 52. A rectangular glass flat 54 (the "movable flat") is secured over the front face of this center section 51. A generally rectangular lip 55, that is integral with the center section 51 of the movable plate, is inclined generally rearwardly from the upper edge of the plate section 51.

The movable plate 50 is also formed with a pair of laterally extending arms 56 and 58 at the opposite respective sides of its center section 51. These arms are integral with and coplanar with the center section. A pair of arm extensions 60 and 61 are integrally connected with and are inclined rearwardly from the opposite lateral sides of the arms 56 and 58 respectively, in symmetrical fashion. A pair of small, generally rectangular tabs 62 and 64 respectively (FIG. 3) extend from the opposite sides of the extensions 60 and 61, and are aligned in a common plane that is parallel to the plane of the center section 51. Each of these tabs 62 and 64 is formed at its upper and lower ends respectively with a pair of brackets 65 that are arranged so that, in side elevation as shown in FIG. 4, the tab and its upper and lower brackets are generally C-shaped. A pair of contoured rollers 66 are journaled between the two pairs of brackets 65. A pair of small angle brackets 68 (FIG. 5) are secured to the respective rear faces of the tabs 62 and 64. These brackets have downwardly depending ears 69 (FIGS. 1 and 4).

A pair of large angle brackets 70 (FIGS. 2 and 5) are secured to the rear faces of the arms 56 and 58 respectively of the movable plate. A pair of wedge cams 71 are secured to the respective front faces of these angle brackets 70, and are disposed to engage in the V-shaped grooves 39 in the stationary plate, respectively. The leaf springs 41, that are affixed to the rear face of the stationary plate 27, are disposed normally to engage against the rear faces of the angle brackets 70, to exert a resilient force thereagainst.

In the assembled film gate, the movable plate 50 is disposed with its rectangular window 52 disposed in alignment with the rectangular window 28 in the stationary plate 27. The window 28 in the stationary plate is somewhat larger, in all directions, than the window 52 in the movable plate. The angle brackets 70 are adjusted, upon assembly of the film gate, so that the wedge cams 71 normally, in the closed position of the film gate, as shown in FIG. 2, have their surfaces disposed to be slightly spaced from the respective confronting surfaces of the V-shaped grooves 39 in the rear face of the stationary plate. The two glass flats 45 and 54 have confronting surfaces that are normally engaged against each other, in the closed position of the film gate illustrated in FIG. 2. These glass flats are selected to have extremely flat confronting surfaces, preferably within 4 fringes, to receive the film therebetween.

As the film gate is assembled in the reader-printer, as can be seen in FIG. 6, the movable and stationary plates of the film gate, and the two glass flats, are disposed to be at a right angle to the optical axis A. The optical axis A is inclined to the horizontal, and the axes of the rollers 66, over which the film is to be passed, are similarly inclined.

To permit the film reels to be mounted properly relative to the optical axis A, the table top panels 10 and 11 are formed with inclined mounting platforms 74 and 75 (FIGS. 1 and 2) respectively. These platforms are inclined so that the spindles and reels that are mounted thereon have axes that are in parallelism with the axes of the rollers 66, and present the film for travel through the film gate in a position that is transverse of the optical axis.

The reel mountings are generally the same in structure, although at opposite sides of the reader-printer, and accordingly, like numerals are used for like parts of these mountings.

The mounting platform 75 is formed with an elongate slot 76 (FIG. 2), that extends over a central part of the front portion of the platform. The platform 75 is also formed with a threaded bore 78 (FIG. 1). A slider bar 80 is mounted for sliding movement over the upper surface of the platform 75. This slider 80 is formed, adjacent one of its ends, with a downwardly depending pin 81, that is disposed to project through the slot 76 in the mounting platform, to guide and to limit the sliding movement of the slider. The slider is also formed with an elongate slot 82 (FIG. 2), and a shoulder stud 84 is passed through the slot and threaded into the bore 78 in the mounting platform. The head of the stud 84 serves as a retainer for the slider, and its shank serves to guide and to limit the sliding movement of the slider. The slider 80 is formed at one of its ends with an upturned arm 85, that is disposed to engage against the downwardly depending ear 69 on the angle bracket 68 that is secured to the tab 64 at the outermost extremity of the movable plate 50.

The mounting platform 75 is also formed with a bore 87 (FIG. 7). One end of a spindle 88 is engaged in this bore or aperture. The spindle 88 is formed at its upper end with a socket 89 for detachably receiving therein the drive end of a crank 90. The spindle is also formed, below its socket portion, with a portion 91 of square cross section, for receiving a reel thereover. A housing ring 92, that has a knurled periphery, is secured to the spindle immediately below the square-section portion 91, for rotation upon rotation of the spindle. The spindle is formed, below the housing ring 92, with a threaded section 95, from the lower end of which a reduced extension 93 projects downwardly. The extension 93 is threaded throughout its length. A nut 94 is threaded on the threaded section 95 of the spindle, below the housing ring 92. This nut 94 can be adjusted in position by rotating it, to engage against the upper surface of the mounting platform 75 and to hold the spindle at a desired elevation thereon.

A one-way clutch is threaded on the extension 93 at the lower end of the spindle. This clutch is a commercially available item. This clutch includes a top washer 96, a clutch housing 97, and a clutch assembly 98. A felt ring 99 is interposed between the housing 97 and assembly 98. A locking plate 100 is threaded onto the projecting lower and of the spindle extension 93, and a screw 101 is threaded through a bore in the locking plate. The end of the screw 101 can be engaged or jammed against the lower face of the clutch assembly 98, in order to lock the clutch assembly in a fixed position on the spindle.

A generally U-shaped brake strap 105 is passed about the clutch housing 97, and a felt annulus 102 is interposed between the housing and the strap. The two free arms 106 of the strap 105 project radially outwardly from the spindle and are adjustably secured together by a screw 108 that is passed through an opening in one of the arms and that is threaded into a threaded bore in the other of these arms. The brake strap arms 106 are disposed so that the pin 81 of the slider 80 projects between them. The screw 108 is located in close proximity to the surface of the clutch housing 97, so that as it is adjusted, to move the arms 106 of the brake strap 105 toward or away from each other, the frictional engagement of the brake strap against the surface of the housing is increased or decreased respectively.

A pair of empty reels 110 and 111 are shown mounted on the spindles in FIG. 1. In FIG. 2, the same reels are shown with a greater amount of film F wound on the reel 111 than on the reel 110, with the film threaded through the film gate, and the film gate in its closed position, to permit viewing of or reproduction of the part of the film that is aligned with the windows in the film gate.

In operation of the reader-printer, as modified in accordance with the present invention, a particular portion of the film F can be viewed or reproduced when it is threaded through the film gate, and is aligned with the windows in the film gate. In order to transport the film for any reason, for example from the left hand reel 110 to the right hand reel 111, the right hand crank is rotated in a clockwise direction, relative to FIG. 2. As rotation of the right hand crank, reel, and spindle are begun, through the application of force to the crank, some tension is immediately applied to the film F. However, as the spindle begins to rotate, the clutch housing 97 and clutch assembly 98 also rotate, and the brake strap 105 is also caused to rotate, in a clockwise direction.

As the brake strap 105 rotates, its trailing arm 106 engages against the pin 81 on the slider, and as rotation of the spindle and brake strap are continued, the pin is pushed by the brake strap to force the slider 80 to the left. The slider arm 85 engages against the downwardly depending ear 69 of the bracket 68 of the movable plate, and the movable plate is shifted to the left, which causes the surfaces of the wedge cams 71 to engage against the left surfaces of the V-shaped grooves 39 in the rear of the stationary plate 27.

As the movement of the slider and of the movable plate continue, the wedge cams ride up the surface of the grooves, forcing the angle brackets 70 against the springs 41 to press the springs toward the rear, and moving the movable glass flat 54, that is secured to the front face of the movable plate, toward the rear. This opens the film gate, to provide a gap between the confronting surfaces of the glass flats 45 and 54, and to provide an unobstructed path through which the film can move.

As the right hand reel is initially rotated, the film F is drawn taut. The film exerts a force against the roller 66 at the right side of the film gate that cooperates with the action of the slider to shift the movable plate to the left relative to FIG. 2, thereby to shift the film gate to its open position.

Continued rotation of the right spindle, to wind up the film on the right reel, exerts a continuous torque on the brake strap 105. However, the movement of the movable plate 50 is limited by the engagement of the right angle bracket 70 against the column 35. When this engagement occurs, the film gate is fully open, and the right slider is at the limit of its movement. The brake strap 105 then begins to slide on its felt annulus or collar 102, and applies a constant force to the pin 81, to hold the film gate open.

As the film begins to transport, it is unwound from the supply reel, which is the left hand reel, relative to FIG. 2. As this reel is rotated, its spindle and clutch parts are also rotated, in a clockwise direction, to shift the left brake strap in a clockwise direction and thus to move the pin on the left hand slider, and the slider itself, to disengage the ear on the left bracket 68 of the movable plate, so as to offer no resistance to the opening of the film gate.

As soon as the winding action stops, the springs 41 return the film gate to its closed position.

The clutches on both reels are adjusted to offer resistance to unwinding, in order to keep the film taut, and to avoid film waving and fluttering.

Proper tension adjustments on the film spindles are desirable in order to insure against film damage, and also in order to effect proper opening and closing of the film gate. These adjustments are easily made by adjusting the drag of the brake strap so that there is sufficient tension on the film, as it is wound, to keep the film from waving or fluttering. Too much drag may cause film breakage. The adjustment of drag is made on the side opposite the spindle that is being turned to advance the film. That is, if the right hand reel is being rotated in a clockwise direction to advance the film, then the film tension is adjusted on the left hand spindle. To adjust the tension on the left hand spindle, for example, to decrease film tension, the screw 101 is loosened, and the clutch assembly 98 is rotated, by gripping its knurled periphery and using it as a knob, to back it off on its spindle slightly. The spindle is held, as the clutch assembly 98 is backed off, to keep the spindle from rotating. Film tension is then checked by rotating the right hand reel in a clockwise direction, relative to FIG. 2. The adjustment is repeated as necessary until proper tension is obtained, and then the locking screw 101 is again tightened in place, to lock the clutch assembly 98 on the spindle. To increase film tension, the clutch assembly 98 is rotated in the opposite direction to move it up further onto the spindle. The tension on both spindles can be adjusted in the same manner.

To adjust the opening action of the film gate, each brake strap is separately adjusted. The turning screw 108 of each brake strap 105 is turned in the direction necessary to cause the film gate to open completely when its associated film spindle is rotated in the direction to cause transport or advance of the film.

While the film gate that is made in accordance with the present invention has been disclosed for use in conjunction with a particular reader-printer, nevertheless this film gate is susceptible of use in many different applications, and offers valuable advantages in safeguarding film against damage.

While the foregoing description relates to one preferred embodiment of the invention, there are several possible modifications of the invention that are contemplated and that are within the scope of the invention. For example, instead of using wedge cams, where the camming action is obtained by a sliding movement, balls or rollers could be used. However, the sliding wedge cams are preferred because of their mechanical simplicity.

Similarly, instead of using a one-way clutch, with a friction drag, to open the film gate, a ratchet arrangement could be used. The use of a ratchet has the advantage of eliminating frictional resistance to rotation, but tends to be noisy. Also, instead of the mechanical system that is employed for opening and for closing the film gate, a solenoid could be used to operate a lever to open and to close the gate.

One of the important advantages, of a film gate that is constructed in accordance with the present invention, is that scratching and other damage to the film is avoided. Another important advantage is that the drag on the unwind reel spindle assists in keeping the film taut, thereby avoiding film waving and fluttering.

In order to convert the reader-printer from the film holder of the Robbins et al. application for use with microfilm on reels, in accordance with the present invention, the table top panels of the reader-printer are modified, as shown in FIGS. 1 and 2 hereof, to have mounting platforms 74 and 75, and the spindles are installed. The film holder is removed simply by detaching the springs 43 from the film holder and then removing the film holder. The film gate 15 is inserted in place, and the springs 43 are sprung out to accommodate the film gate, and then are engaged over the projections 40, which hold these springs in place. The film gate can be used with aperture cards and microfilm jackets, but it is preferred to replace the film gate with the original holder, which is a simple, fast operation.

While the invention has been disclosed herein by reference to the details of a preferred embodiment thereof, it is to be understood that such disclosure is intended in an illustrative, rather than in a limiting sense, and it is contemplated that various modifications in the construction and arrangement of the parts will readily occur to those skilled in the art, within the spirit of the invention and the scope of the appended claims.

We claim:

1. A film gate for holding a lengthwise-extending portion of a film in a projection plane when the film is at rest, and for providing a path through which the film can be freely transported, comprising a support member against which the film can be engaged, a bearing member for engaging the film to urge it against the support member, to hold the film in the projection plane, said members being mounted for movement relative to each other, a cam that is fixed relative to one of said members and that is rigidly interconnected therewith, a cam surface that is fixed relative to the other of said members and that is rigidly interconnected therewith, and means for causing relative movement between said cam and cam surface, for causing relative movement between said members, to provide a path for the transport of film therebetween.

2. The combination as set forth in claim 1 wherein said means for causing relative movement between said cam and cam surface includes a film contact element affixed to one of said members and positioned to contact said film when said film is taut and being transported through said gate and is oriented to transmit a force component from said taut film in a direction to tend to maintain said members separated from each other.

3. A film gate in accordance with claim 1 wherein said cam and said cam surface are disposed to be disengaged and spaced from each other when said bearing member is engaged against the film to hold it against said support member.

4. A film gate for holding a lengthwise-extending portion of a film in a projection plane and transversely of the optical axis in an optical projection system when the film is at rest, and for providing a path through which the film can be freely transported, comprising
a support member against which the film can be engaged,
a bearing member for engaging the film to urge it against the support member, to hold the film in the projection plane,
said members being mounted for movement relative to each other in a direction generally transverse to the optical axis, and toward and away from each other,
a cam that is fixed relative to one of said members and that is rigidly interconnected therewith,
a cam surface that is fixed relative to the other of said members and that is formed in a member that is rigidly interconnected therewith, said cam and said cam surface being disposed so that, upon movement of one of said members transversely of the optical axis, they move into engagement with each other and cause relative movement of the members either toward or away from each other, depending upon the direction of the transverse movement,
and means for causing said one member to be moved transversely of the optical axis to cause the camming action to occur.

5. The combination as set forth in claim 4 wherein said means for causing said one member to be moved transversely of the optical axis includes a film contact element affixed to one of said members and positioned to contact said film when said film is taut and being transported through said gate and is oriented to transmit a force component from said taut film in a direction to tend to maintain said members separated from each other.

6. A film gate in accordance with claim 4 wherein said cam and said cam surface are complementary and are generally V-shaped in section in a plane that is parallel to the direction of film transport and normal to the projection plane.

7. A film gate for holding a lengthwise-extending portion of a film in a projection plane and transversely of the optional axis in an optical projection system when the film is at rest, and for providing a path through which the film can be transported freely, comprising
a first, stationary optical flat that is disposed along said path, and against which the film can be engaged,
a second optical flat that is mounted for movement relative to said stationary flat, toward and away from the stationary flat and transversely of the optical axis, from a first, closed gate position in which the movable flat is engaged against the film, to hold it against the stationary flat and in the projection plane, to a second, open gate position in which the movable flat is evenly spaced from its first position and from the stationary flat, to permit transport of the film relative to the stationary flat free from forced engagement against the stationary flat,
gate control means including cam means for causing movement of said movable flat between its first position and its second position upon movement of one of said flats transversely of the optical axis.

8. The combination as set forth in claim 7 wherein said gate control means includes a film contact element affixed to one of said members and positioned to contact said film when said film is taut and being transported through said gate and is oriented to transmit a force component from said taut film is a direction to tend to maintain said members separated from each other.

9. A film gate in accordance with claim 7 wherein said cam means comprises
a first camming element that is rigidly interconnected with said stationary flat, and
a second camming element that is mounted for movement as a unit with said movable flat, and that is formed and disposed for cooperation with said first caming element to produce a camming action for causing the movement of said movable flat from its first position to the second position.

10. A film gate in accordance with claim 9 wherein said camming elements are disposed to be disengaged from each other when said movable flat is in its first, closed gate position.

11. A film gate in accordance with claim 7 including spring means mounted constantly to urge said movable optical flat to its said first position.

12. A film gate for holding a lengthwise-extending portion of a film transversely of the optical axis in an optical projection system, and in a projection plane when the film is at rest, and for providing a path through which the film can be transported freely between a first location and a second location, in either direction, comprising
a stationary optical flat that is disposed along said path in position for receiving the film against one surface thereof at the projection plane,
a movable optical flat that is mounted for movement relative to said stationary flat from a first, closed gate position in which the movable flat is engaged against said film portion and in which the film is at rest, to a second, open gate position in which the movable flat is spaced from its first position and from said stationary flat both along and laterally of said optical axis, to permit transport of the film relative to the stationary flat free from forced engagement against the stationary flat,
cam means for causing movement of said movable flat between its first position and said second position upon movement of said movable flat laterally of the optical axis,
springs means mounted constantly to urge said movable flat toward its said first, closed gate position,
and a pair of actuating means mounted at opposite sides of said movable flat respectively for movement as a unit with each other and with said movable flat, one of which actuating means can be moved in one direction laterally of the optical axis to actuate said cam means to open the gate and the other of which can be engaged and moved in the opposite direction laterally of the optical axis to actuate said cam means to open the gate.

13. A film gate in accordance with claim 12 wherein said cam means comprises
a cam that is mounted for movement upon movement of said movable flat,
and a cam surface that is formed in a member that is rigidly interconnected with said stationary flat,
said cam and said cam surface being complementary in shape and generally V-shaped in section in a plane that is parallel to the direction of film transport and normal to the project plane, and being disposed to be disengaged from each other when said movable flat is in its first, closed gate position.

14. The combination as set forth in claim 12 wherein each of said actuating means includes a film contact element affixed to one of said members and positioned to contact said film when said film is taut and being transported through said gate and is oriented to transmit a force component from said taut film in a direction to tend to maintain said members separated from each other.

References Cited by the Examiner

UNITED STATES PATENTS

| | | | |
|---|---|---|---|
| 2,279,463 | 4/1942 | Hopkins | 352—225 X |
| 2,610,540 | 9/1952 | Beitz | 88—240 X |
| 2,630,739 | 3/1953 | Strauss | 88—240 X |
| 2,659,267 | 11/1953 | Baule | 88—24 |

JULIA E. COINER, *Primary Examiner.*